J. P. MOOS.
Check-Rower for Corn-Planter.
No. 208,195. Patented Sept. 17, 1878.
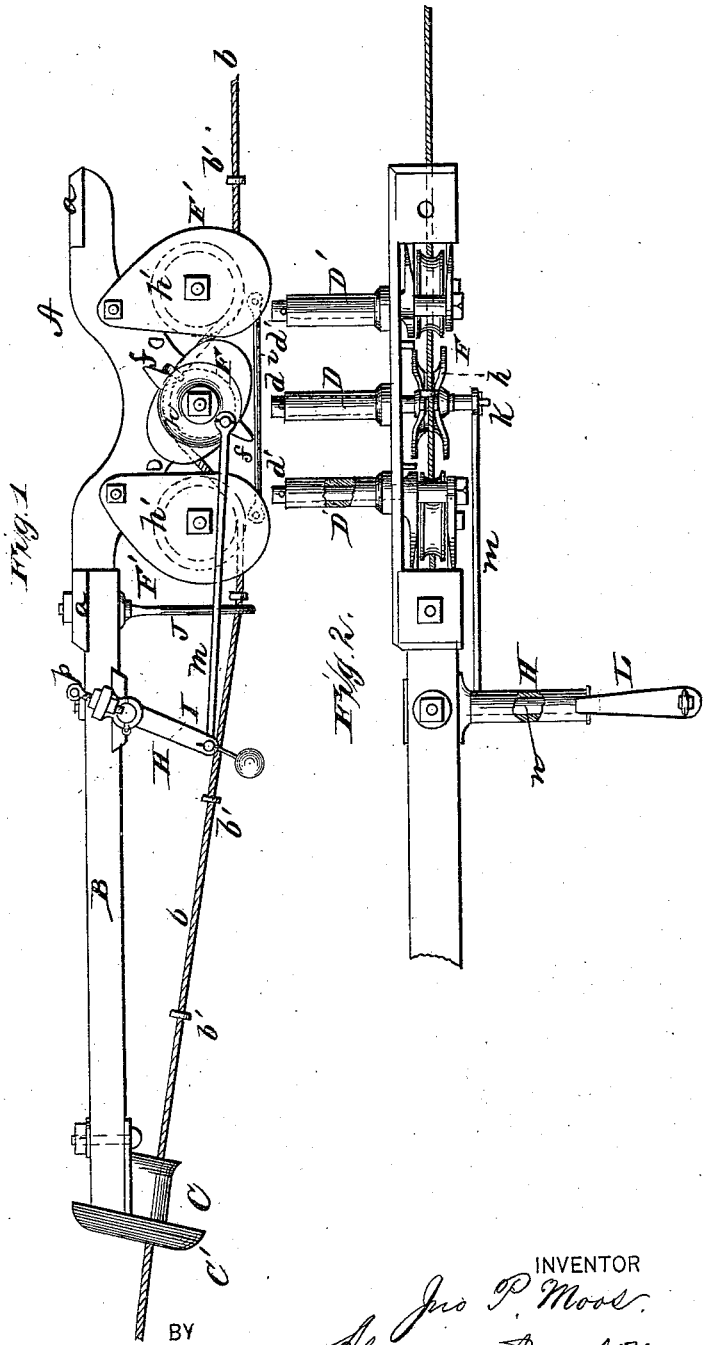
WITNESSES
INVENTOR
BY
ATTORNEYS

UNITED STATES PATENT OFFICE.

JOHN P. MOOS, OF LINCOLN, ILLINOIS.

IMPROVEMENT IN CHECK-ROWERS FOR CORN-PLANTERS.

Specification forming part of Letters Patent No. 208,195, dated September 17, 1878; application filed July 10, 1878.

*To all whom it may concern:*

Be it known that I, JOHN P. MOOS, of Lincoln, in the county of Logan, and in the State of Illinois, have invented certain new and useful Improvements in Center-Drop Check-Rowers for Corn-Planters; and do hereby declare that the following is a full, clear, and exact description thereof, reference being had to the accompanying drawings, and to the letters of reference marked thereon, making a part of this specification.

The nature of my invention consists in the construction and arrangement of a center-drop check-rower for corn-planters, as will be hereinafter more fully set forth.

In order to enable others skilled in the art to which my invention appertains to make and use the same, I will now proceed to describe its construction and operation, referring to the annexed drawing, in which—

Figure 1 is a front elevation of my invention. Fig. 2 is a plan view of the same.

A represents a suitable casting, provided at each end with a foot, $a$, to which a wooden bar, B, is firmly bolted, said bar B being at its outer end provided with a tube, C, formed around its outer edge, with a concavo-convex flange, C', as shown, and the inner edge made flaring, so that the knotted rope $b$ can easily pass through the same. From one side of the casting A project three tubes, D and D' D', which form elongated bearings for three shafts, $d$ and $d'$ $d'$. On the center shaft, $d$, are secured two wings, F F, having upon opposite sides projections $ff$, and between these wings on said shaft is placed a loose pulley, $h$. Upon each of the shafts $d'$ are secured two wings, F' F', and upon a stud or bolt between them is placed a loose pulley, $h'$. The two sets of wings F' are connected by a pivoted rod, $i$.

One of the center wings F is provided with a projecting stud, $k$, which is, by a pivoted rod, $m$, connected with an arm, I, projecting from an elongated sleeve, H, placed on a rod, $n$, secured to and projecting from the wooden bar B. The sleeve H is provided with a projecting arm, L, in the outer end of which is an adjustable eyebolt, $p$, to be connected by a rod with the slide of the planter.

The rope $b$ is provided with knots or their equivalents $b'$ at equal distances apart, and is arranged on the field and over the planter in the usual manner for check-rowers.

In my check-rower the cord passes through the tube C, then through a guide, J, under one pulley $h'$, over the center pulley, $h$, down under the other pulley $h'$, and to the other end of the check-rower.

The wings F' on the two outside rollers or pulleys serve to prevent the rope from slipping off the pulleys. These wings, being fitted on their pivots $d'$, can be moved a short distance back and forth, the object of which is to have them fit so closely to the projections or forks $f$ on the center wings that the rope pulling the pulleys $h'$ toward the center will bring them so close together on one side that the knot on the rope cannot fail to take hold of and act on the center, thus causing it to make half a revolution.

The wings F' being connected together by the rod, $i$, when one pulley $h'$ approaches the center the other will recede, and thus leave space enough for the knot to escape easily after the wheel, with the forks, has made half a revolution.

The slide of the planter is moved twice for every revolution of the forks or center wings.

This check-rower is free from an excess of friction. It has leverage power enough to insure a full stroke of the planter every half-revolution.

When the forks are in their proper position, ready for the rope to take hold, the shaker-rod of the planter should be at a dead-lock, and the fork-wheel (or wings F) must pass the center before the shake-rod can be moved, thus insuring the effectual closing of the corn-box plates, and preventing the dribbling of corn along the row.

Having thus fully described my invention, what I claim as new, and desire to secure by Letters Patent, is—

1. In a check-rower, the combination of the loose pulley $h$ and the wings F with forks $f$, as and for the purposes herein set forth.

2. The swinging wings F', with pulleys $h'$ between them, arranged on opposite sides of the fork-wheel F $h$, and connected by a rod, $i$, substantially as and for the purposes herein set forth.

3. The combination of the bars B, center casting A, with elongated tubes D and D' D' projecting therefrom, the shafts $d$ $d'$ $d'$, wings F F', and pulleys $h$ $h'$, substantially as and for the purposes herein set forth.

In testimony that I claim the foregoing I have hereunto set my hand this 6th day of June, 1878.

JOHN P. MOOS.

Witnesses:
   J. M. MASON,
   F. L. OURAND.